United States Patent
Zeng et al.

(10) Patent No.: US 7,191,099 B2
(45) Date of Patent: Mar. 13, 2007

(54) SYSTEM FOR TESTING NETWORK DEVICES

(75) Inventors: Xin Zeng, Shenzhen (CN); Bangqing Li, Shenzhen (CN)

(73) Assignees: Hong Fu Jin Precision Ind (Shenzhen) Co., Ltd., Shenzhen (CN); Hon Hai Precision Ind. Co., Ltd., Tu-Cheng (TW)

(*) Notice: Subject to any disclaimer, the term of this patent is extended or adjusted under 35 U.S.C. 154(b) by 139 days.

(21) Appl. No.: 10/830,325

(22) Filed: Apr. 21, 2004

(65) Prior Publication Data

US 2005/0021310 A1    Jan. 27, 2005

(30) Foreign Application Priority Data

Jul. 4, 2003    (TW) .............................. 92118394 A

(51) Int. Cl.
*G06F 11/00* (2006.01)
(52) U.S. Cl. .................................... 702/188
(58) Field of Classification Search ................ 702/188
See application file for complete search history.

(56) References Cited

U.S. PATENT DOCUMENTS

2001/0054044 A1* 12/2001 Liu et al. ................. 707/104.1
2002/0133575 A1*  9/2002 Cidon et al. ................ 709/220
2004/0189281 A1*  9/2004 Le et al. ................... 324/158.1
2004/0267502 A1* 12/2004 Aliphas ...................... 702/186

FOREIGN PATENT DOCUMENTS

CN    1369791 A    9/2002

* cited by examiner

*Primary Examiner*—Michael Nghiem
*Assistant Examiner*—Demetrius Pretlow
(74) *Attorney, Agent, or Firm*—Wei Te Chung

(57) ABSTRACT

A testing system (20) includes a database server (201) for storing relevant data employed by the testing system, a gateway (202), a shop flow control server (203) for controlling the operations of the testing system via the gateway, a computer (204) for connecting with the database server and the gateway, a first test end (206) connecting to the computer, and a second test end (209) connecting to the database server and the gateway. The computer includes a board function test module (2040) for performing a board function test, an assembly test module (2042) for performing an assembly test, a system test module (2044) for performing a system test, a high potential test module (2046) for performing a high potential test, and an out of box assurance module (2048) for performing an electrical test. The shop flow control server communicates with the database server and the computer via the gateway.

12 Claims, 5 Drawing Sheets

SYSTEM FOR TESTING NETWORK DEVICES

BACKGROUND OF THE INVENTION

1. Field of the Invention

The present invention relates to a testing system for computers, and more particularly to a system for testing network devices.

2. Description of Prior Art

With the rapid development of the Internet, communication networks are becoming larger and larger. Accordingly, performance requirements of network devices are becoming increasingly stringent. Since the performances of network devices greatly affect smooth operation of a communication network as a whole, all devices employed in the communication network must pass severe tests before being used.

FIG. 5 is a schematic diagram of infrastructure of a conventional testing system 10. The testing system 10 comprises a database server 101, a gateway 102, a shop flow control (SFC) server 103, a plurality of computers 104, a switch 105, a plurality of terminal servers 106 respectively connected to the switch 105 through Ethernet cables 109, a plurality of power sources 107 connected to the terminal servers 106 through the Ethernet cables 109, and a plurality of units under test (UUTs) 108 such as motherboards connected to the power sources 107 through cables 110 such as RS-232 cables. The computers 104 and the switch 105 are coupled to the database server 101 and the gateway 102. Each of the computers 104 comprises a test module. The test module may be a board function test (BFT) module 1040, an assembly test (AT) module 1042, a system test (ST) module 1044, a high potential test (Hipot) module 1046, or an out of box assurance (OBA) module 1048. Any or all of these test modules can alternatively be integrated into any one or more of the computers 104. The terminal servers 106 are used for converting a TCP (Transmission Control Protocol) into an RS-232 protocol. The power sources 107 provide power for the UUTs 108. The Ethernet cables 109 are provided for downloading image files. The image files are system diagnosis programs, and perform hardware initialization/detection and a functional test. The image files comprise a diagnostic program and a traffic test program.

Generally, the testing system 10 operates with a Linux operating system. The testing system 10 comprises three terminal servers 106 and three power sources 107. The UUTs 108 may be motherboards or other network devices. The testing system 10 has five test functions: a board function test, an assembly test, a system test, a high potential test, and an out of box assurance. Only one of the test functions can be performed in the testing system 10 at one time. Since the testing system 10 needs numerous devices, the hardware infrastructure and the software configuration thereof are very complicated. Thus it is difficult to maintain the testing system 10. What is needed is a testing system with simple hardware infrastructure and software configuration.

SUMMARY OF THE INVENTION

Accordingly, a primary object of the present invention is to provide a testing system that has simple hardware infrastructure and software configuration.

In order to fulfill the above-mentioned primary object, the present invention provides a testing system for testing network devices. The testing system comprises a database server for storing relevant data of the testing system, a gateway, a shop flow control server for controlling the operations of the testing system via the gateway, a computer for connecting with the database server and the gateway, a first test end connecting to the computer, and a second test end connecting to the database server. The computer comprises a board function test module for performing a board function test, an assembly test module for performing an assembly test, a system test module for performing a system test, a high potential test module for performing a high potential test, and an out of box assurance module for performing an electrical test. The shop flow control server communicates with the database server and the computer via the gateway.

Other objects, advantages and novel features of the present invention will become more apparent from the following detailed description when taken in conjunction with the accompanying drawings, in which:

DETAILED DESCRIPTION OF THE INVENTION

Figure 1:
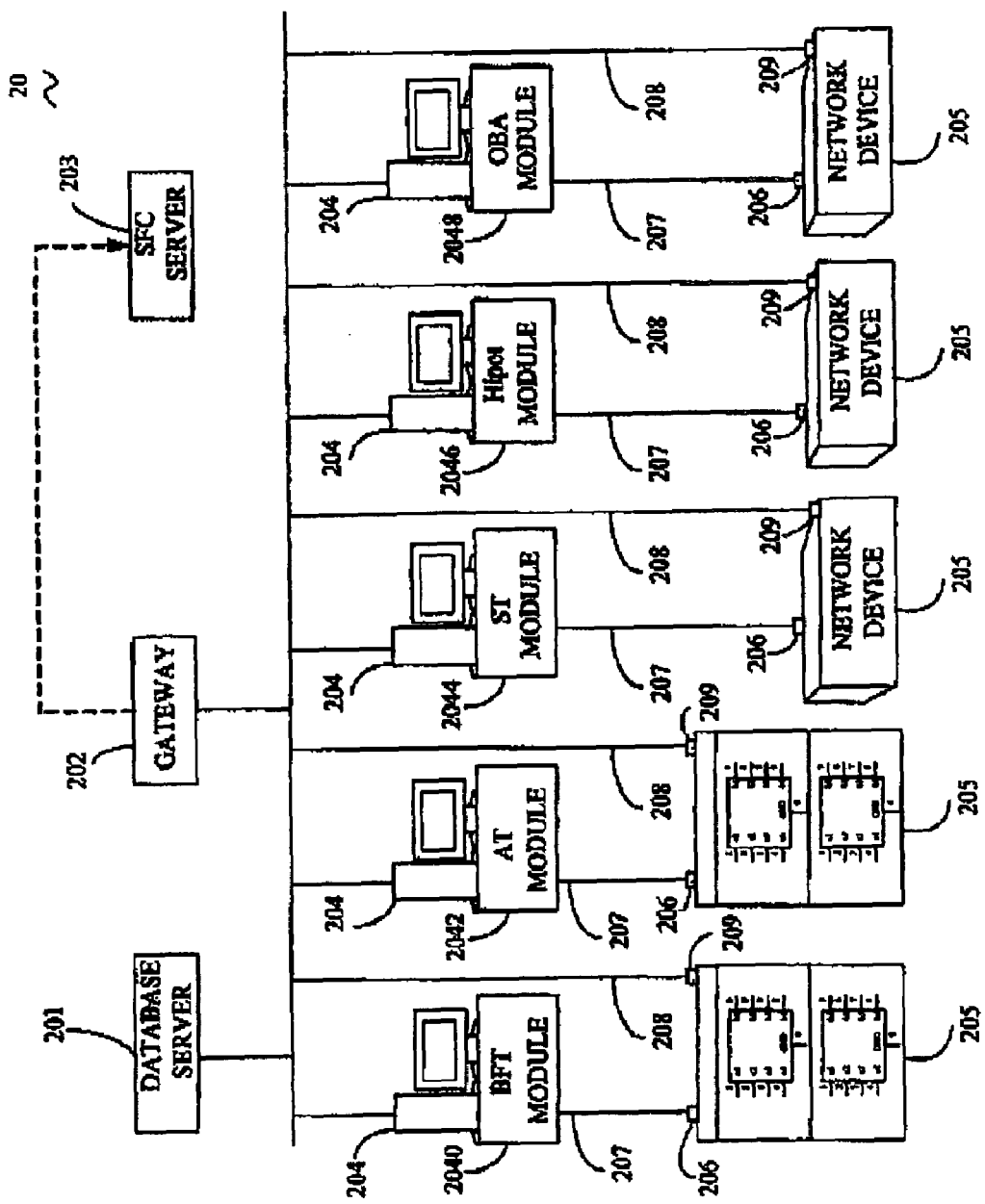
FIG. 1 is a schematic diagram of infrastructure of a testing system according to a preferred embodiment of the present invention.

FIG. 1 is a schematic diagram of infrastructure of a testing system 20 according to a preferred embodiment of the present invention. The testing system 20 operates with a conventional operating system such as Windows NT, and comprises a database server 201, a gateway 202, a shop flow control (SFC) server 203, a plurality of computers 204, a plurality of first test ends 206 connecting to the plurality of computers 204 by way of cables 207 such as RS-232 cables, and a plurality of second test ends 209 connecting to the database server 201 and the gateway 202 by way of Ethernet cables 208. The plurality of first test ends 206 and the plurality of second test ends 209 are coupled to a plurality of units under test (UUTs) 205 such as motherboards and network devices. The plurality of computers 204 are coupled to the database server 201 and the gateway 202. The database server 201 is used for storing relevant data employed by the testing system 20. The gateway 202 is used for connecting the SFC server 203 to the database server 201, the plurality of computers 204 and the plurality of UUTs 205. The SFC server 203 is provided for controlling the operations of the testing system 20 via the gateway 202. Each of the computers 204 comprises a test module. The test module may be a board function test (BFT) module 2040, an assembly test (AT) module 2042, a system test (ST) module 2044, a high potential test (Hipot) module 2046 or an out of box assurance (OBA) module 2048. In an alternative preferred embodiment, any one or more of these test modules can be integrated into any one or more of the computers 204. The Ethernet cables 208 are used for downloading image files. The image files are system diagnosis programs, which perform hardware initialization/detection, and function tests. The image files comprise a diagnostic program and a traffic test program. The testing system 20 can test only one UUT 205 at one time, such as a motherboard or a network device.

The testing system 20 has five test functions: a board function test performed by the BFT module 2040, an assembly test performed by the AT module 2042, a system test performed by the ST module 2044, a high potential test performed by the Hipot module 2046, and an out of box assurance performed by the OBA module 2048. Only one of said test functions can be performed in the testing system 20 at one time. The board function test is mainly for assigning a media access control (MAC) address to a UUT 205, and for configuring IP addresses for the UUT 205 and a trivial file transfer protocol (TFTP) server (not shown). The assembly test comprises a wireless traffic test. The system test is mainly for running a diagnostic program, and for performing a wireless traffic test and an internal traffic test. The high potential test is provided for performing electrical tests on the UUT 205 by using a direct current (DC) stronger than a working current of the UUT 205. The out of box assurance is mainly provided for checking if the UUT 205 can be started up when a power source (not shown) is turned on.

Figure 2:
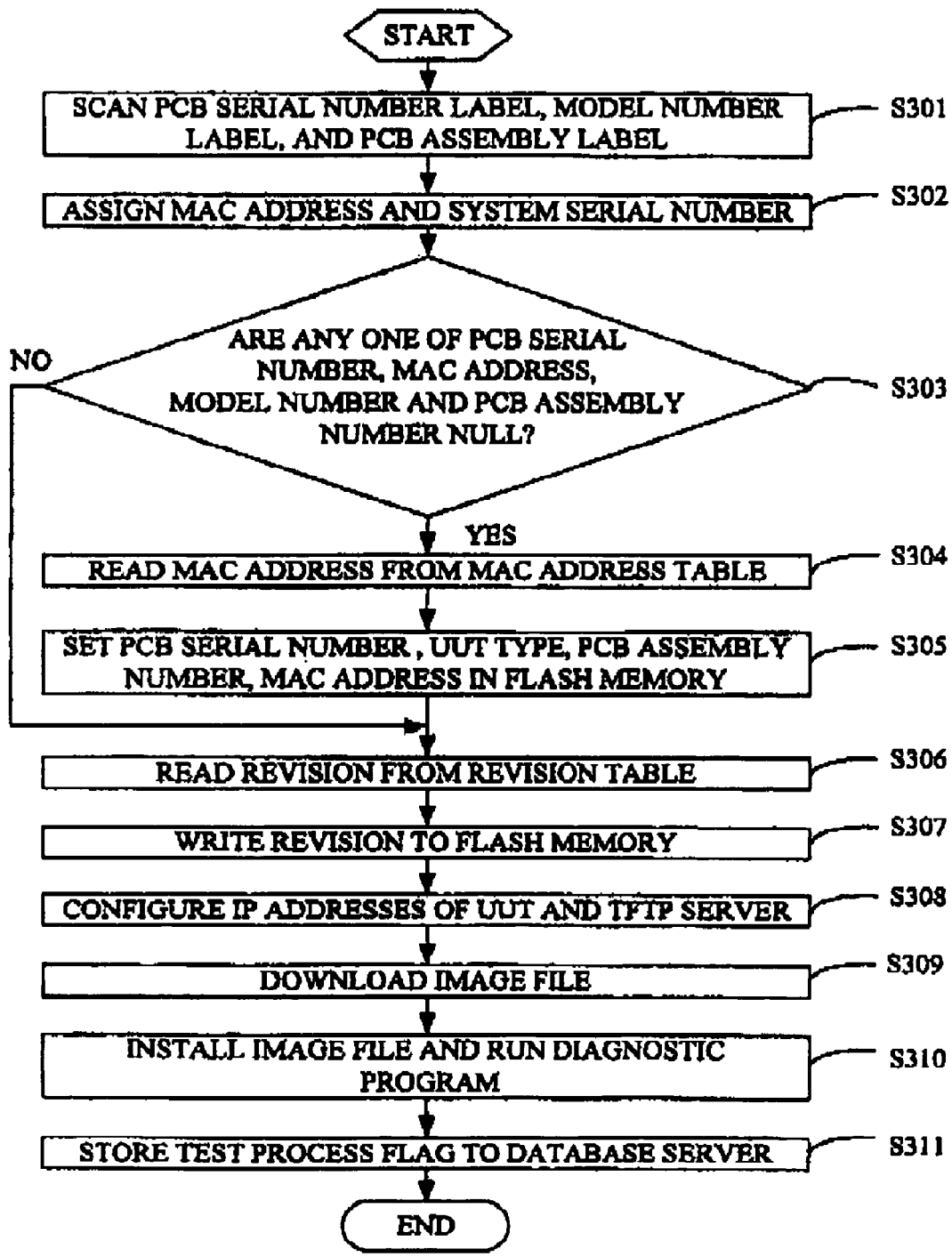
FIG. 2 is a flow chart of a preferred method for performing a board function test on a UUT according to the present invention.

FIG. 2 is a flow chart of a preferred method for performing a board function test on a UUT 205 according to the present invention. Before the board function test is performed, the following steps should be followed by users: attaching a printed circuit board (PCB) serial number label and a model number label on the UUT 205; defining a MAC address range for the UUT 205; making sure that some commands can be used to write parameters to a flash memory of the UUT 205; determining and attaching a PCB assembly number label on the PCB of the UUT 205; and determining a version of an image file.

At step S301, the testing system 20 scans the PCB serial number label, the model number label and the PCB assembly number label on the UUT 205 to obtain the PCB serial number, the model number and the PCB assembly number. At step S302, the testing system 20 assigns a MAC address and a system serial number to the UUT 205. At step S303, the testing system 20 determines whether any one of the PCB serial number, the MAC address, the model number and the PCB assembly number are null. If so, the procedure goes to step S304. Otherwise, the procedure goes directly to step S306 described below. At step S304, the testing system 20 reads the MAC address from a MAC address table. The MAC address table is assigned by a user. At step S305, the testing system 20 sets the PCB serial number, the type of the UUT 205, the PCB assembly number and the MAC address in the flash memory of the UUT 205. At step S306, the testing system 20 reads revisions from a revision table specified by an engineering change notice (ECN). The revisions relate to engineering revisions of the UUT 205. At step S307, the testing system 20 writes the revisions to the flash memory of the UUT 205. At step S308, the testing system 20 configures IP addresses of the UUT 205 and the TFTP server. At step S309, the testing system 20 downloads an image file. At step S310, the testing system 20 installs the image file, and runs a diagnostic program therein. At step S311, the testing system 20 stores a test process flag in the database server 201.

Figure 3:
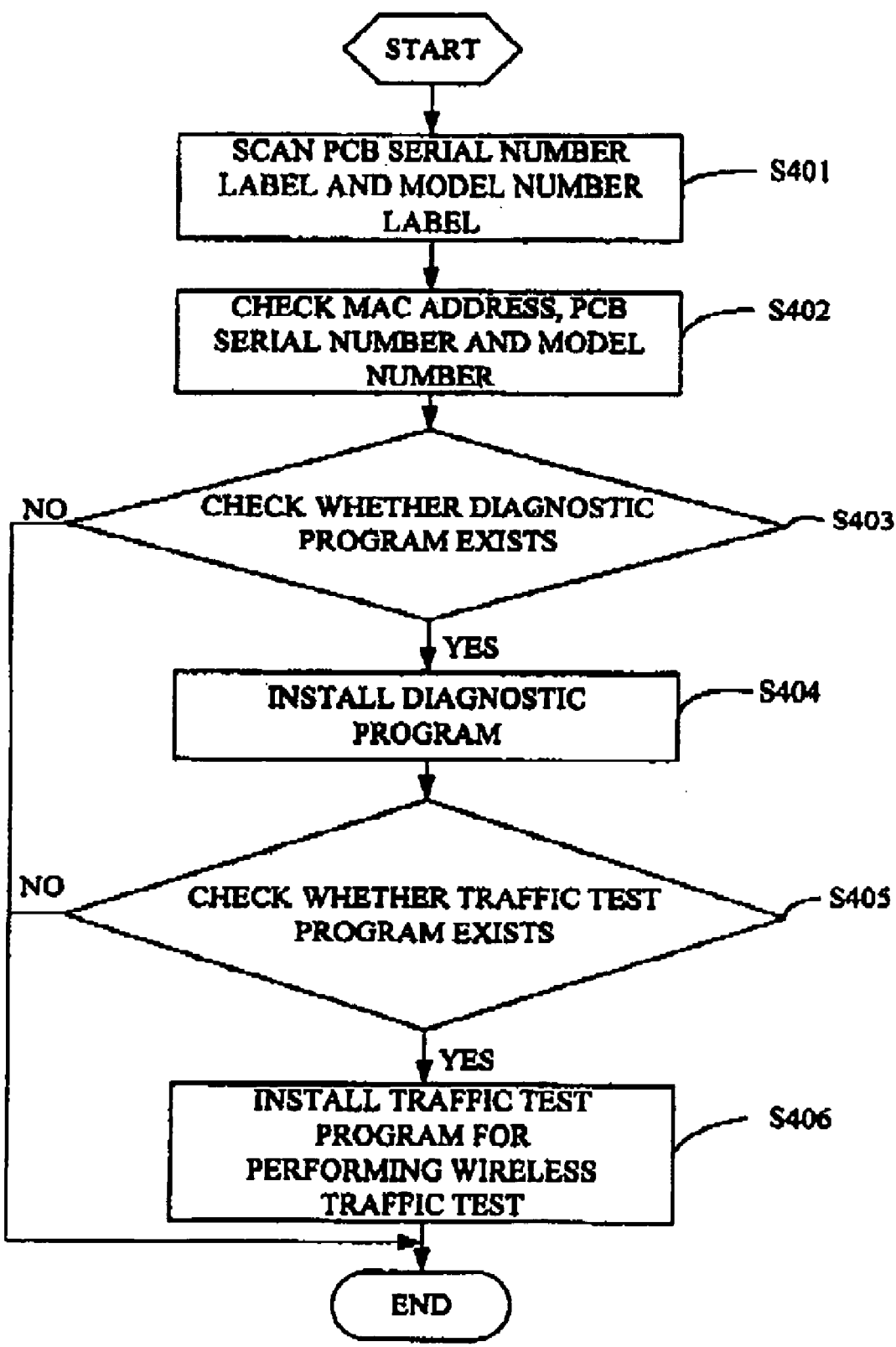
FIG. 3 is a flow chart of a preferred method for performing an assembly test on a UUT according to the present invention.

FIG. 3 is a flow chart of a preferred method for performing an assembly test on a UUT 205 according to the present invention. At step S401, the testing system 20 scans the PCB serial number label and the model number label on the UUT 205. At step S402, the testing system 20 checks the MAC address, the PCB serial number and the model number of the UUT 205 in order to prevent duplication. At step S403, the testing system 20 determines if a diagnostic program exits. If so, the procedure goes to step S404. Otherwise, the assembly test is completed. At step S404, the testing system 20 installs the diagnostic program. At step S405, the testing system 20 determines whether a traffic test program exits. If so, the procedure goes to step S406. Otherwise, the assembly test is completed. At step S406, the testing system 20 installs the traffic test program for performing a wireless traffic test.

Figure 4:
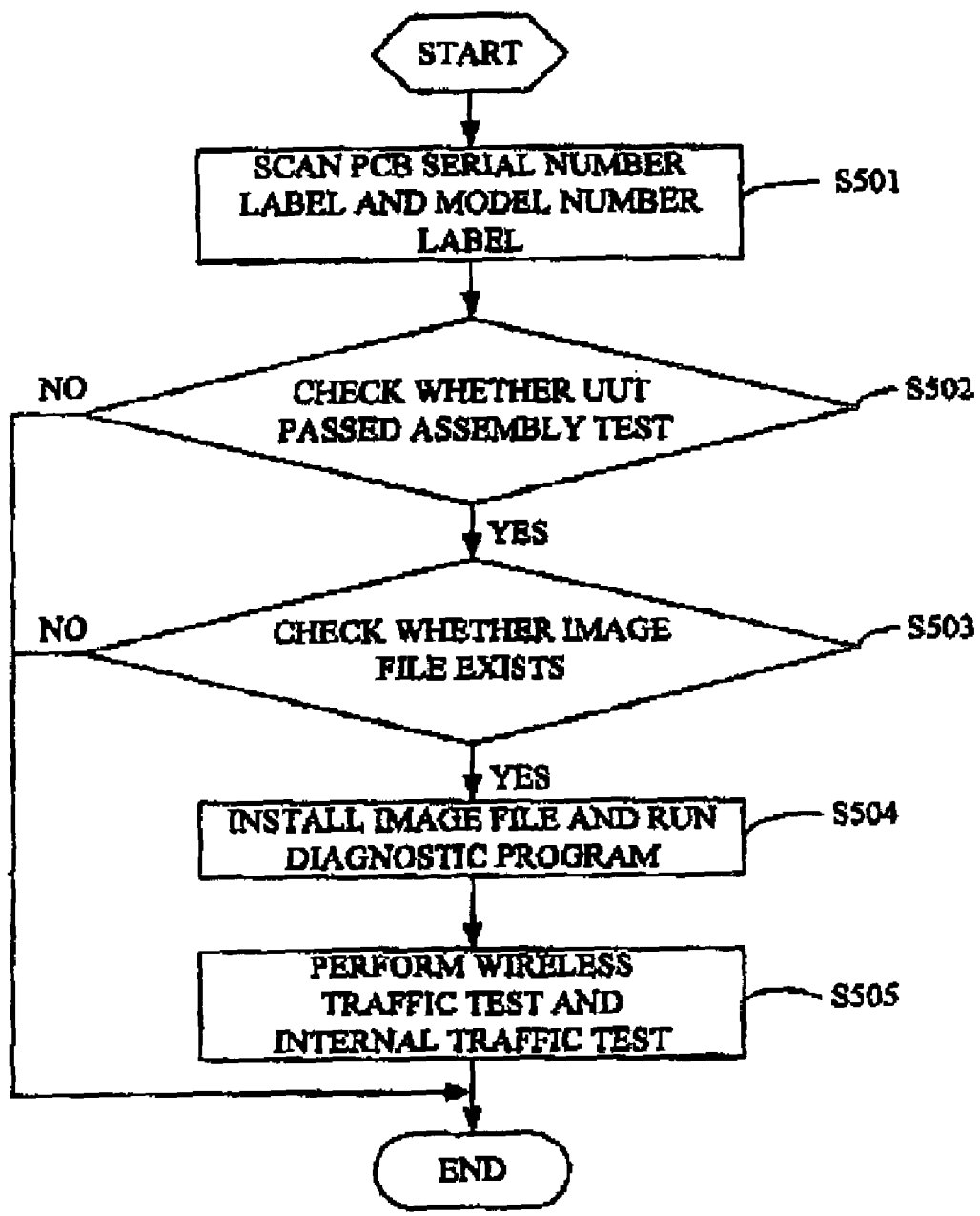
FIG. 4 is a flow chart of a preferred method for performing a system test on a UUT according to the present invention.
Figure 5:
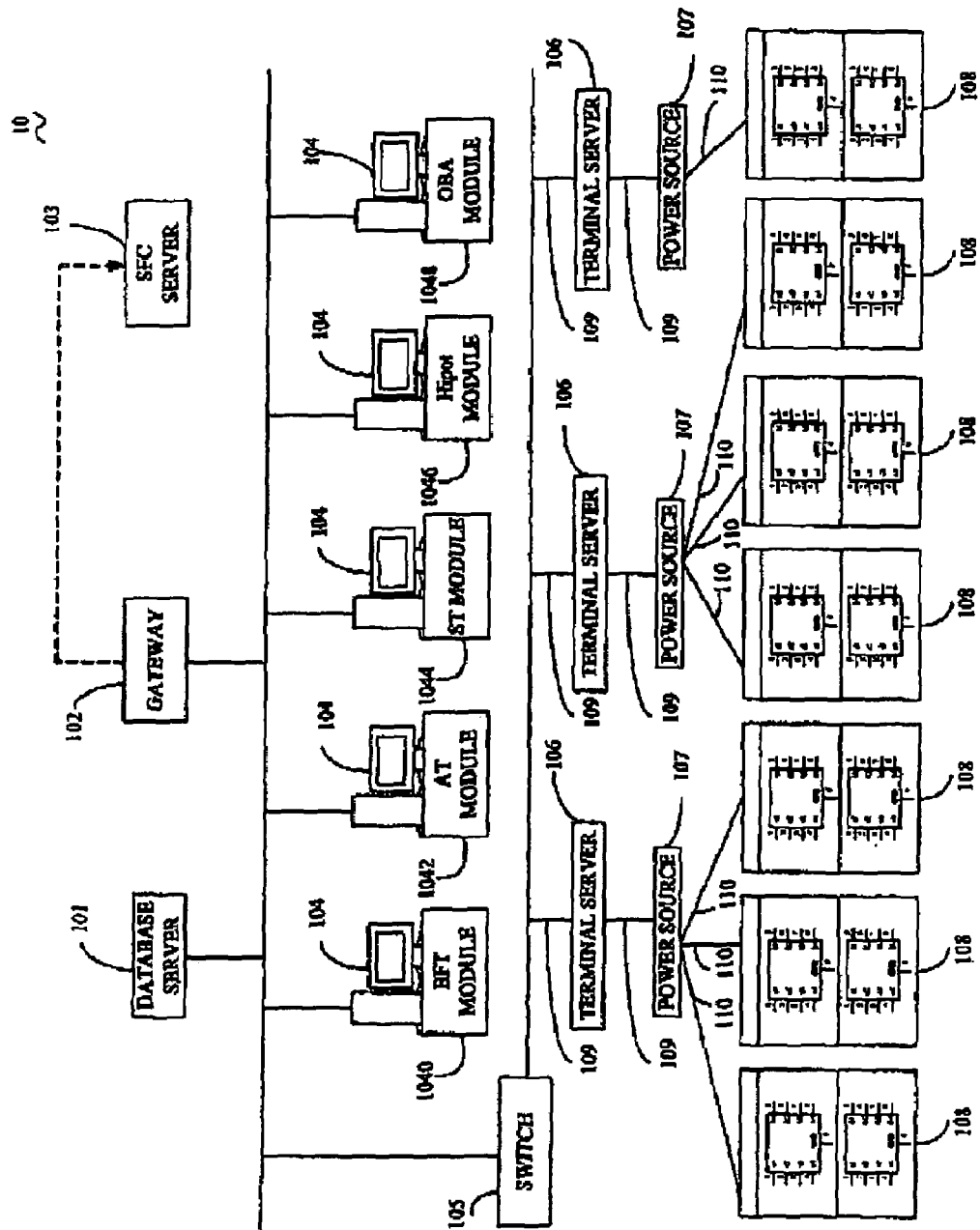
FIG. 5 is a schematic diagram of infrastructure of a conventional testing system.

FIG. 4 is a flow chart of a preferred method for performing a system test on a UUT 205 according to the present invention. At step S501, the testing system 20 scans the PCB serial number label and the model number label on the UUT 205. At step S502, the testing system 20 checks whether the UUT 205 has passed the above-described assembly test. If so, the procedure goes to step S503. Otherwise, the system test is completed. At step S503, the testing system 20 checks whether the image file exits. If so, the procedure goes to step S504. Otherwise, the system test is completed. At step S504, the testing system 20 installs the image file, and then runs the diagnostic program therein. At step S505, the testing system 20 performs a wireless traffic test and an internal traffic test.

While a preferred embodiment and preferred methods of the present invention have been described above, it should be understood that they have been presented by way of example only and not by way of limitation. Thus the breadth and scope of the present invention should not be limited by the above-described exemplary embodiment and methods, but should be defined only in accordance with the following claims and their equivalents.

What is claimed is:

1. A testing system for testing a network device, the testing system comprising:
    a database server for storing relevant data employed by the testing system;
    a shop flow control server for controlling the operations of the testing system;
    a first computer connecting with the database server, said first computer comprising a system test module for performing a system test;
    at least one second computer connecting with the database server, said at least one second computer comprising any one or more of the following modules:
        a board function test module for performing a board function test;
        an assembly test module for performing an assembly test;
        a high potential test module for performing a high potential test; and
        an out of box assurance module for performing an electrical test;
    at least one first test end connecting to said at least one second computer and said first computer; and
    at least one second test end connecting to the database server.

2. The testing system as claimed in claim 1, further comprising a gateway connecting to the shop flow control server.

3. The testing system as claimed in claim 2, wherein the shop flow control server communicates with the database server, said at least one second computer, and said first computer via the gateway.

4. The testing system as claimed in claim 1, wherein said at least one first test end connects to said at least one second computer and said first comnuter via at least one RS-232 cable.

5. The testing system as claimed in claim 1, wherein said at least one second test end connects to the database server and the gateway via at least one Ethernet cable.

6. A method of testing a network device, comprising steps of:
> providing a database server for storing relevant data employed by the testing system;
> providing a shop flow control server controlling the operations of the testing system;
> providing a first computer connecting with the database server,
>> said first computer comprising a system test module for performing a system test;
> providing at least one second computer connecting with the database server, said at least one second computer comprising any one or more of the following modules:
>> a board function test module for performing a board function test;
>> an assembly test module for performing an assembly test;
>> a high potential test module for performing a high potential test; and
>> an out of box assurance module for performing an electrical test;
> connecting at least one first test end to said at least one second computer and said first computer, and
> connecting at least one second test end to the database server.

7. The testing system as claimed in ciaim 1, wherein said system test comprises a wireless traffic test.

8. The testing system as claimed in claim 7, wherein said system test further comprises an internal traffic test.

9. The testing system as claimed in claim 8, wherein said system test further comprises running a diagnostic program.

10. The method as claimed in claim 6, wherein said system test comprises a wireless traffic test.

11. The method as claimed in claim 10, wherein said system test further comprises an internal traffic test.

12. The method as claimed in claim 11, wherein said system test further comprises running a diagnostic program.

* * * * *